United States Patent [19]
Bruce et al.

[11] Patent Number: 5,734,389
[45] Date of Patent: Mar. 31, 1998

[54] RADAR SYSTEM AND METHOD OF OPERATING SAME

[76] Inventors: Lloyd D. Bruce, 12 Gilbert St., North Andover, Mass. 01845; Dell R. Malstrom, 58 Hartshorn St., Reading, Mass. 01867

[21] Appl. No.: 147,205

[22] Filed: Nov. 3, 1993

[51] Int. Cl.[6] .................................................. G01S 13/08
[52] U.S. Cl. ............................................................ 342/68
[58] Field of Search ............................ 342/68, 128, 145; 364/561; 102/427

[56] References Cited

U.S. PATENT DOCUMENTS

| | | | |
|---|---|---|---|
| 4,014,021 | 3/1977 | Fournier et al. | 342/128 |
| 5,175,553 | 12/1992 | Le Garrec | 342/145 |

OTHER PUBLICATIONS

"Radar Handbook—Second Edition," edited by Merrill I. Skolnik, published by McGraw–Hill Publishing Company, 1990, pp. 10.19 to 10.25.

*Primary Examiner*—Daniel T. Pihulic
*Attorney, Agent, or Firm*—Donald F. Mofford

[57] ABSTRACT

A proximity fuze radar system is described including a transmitter for transmitting a signal modulated by a pseudo-random noise code signal and a receiver for receiving signals including the modulated signal reflected by an object or target. The proximity fuze radar system further includes delay circuitry for delaying in time the pseudo-random noise code signal for providing a delayed noise code signal and circuitry for correlating a near range portion of the received signals with the delayed noise code signal and for providing base band signals. The proximity fuze radar system still further includes suppression circuitry for correlating a longer range portion of the received signals with the delayed noise code signal and for providing a rejection signal for summing the base band signals with the rejection signal to reduce the signal level of undesired signals. With such an arrangement, a radar system is provided having less susceptibility to undesired signals.

14 Claims, 6 Drawing Sheets

RADAR SYSTEM AND METHOD OF OPERATING SAME

BACKGROUND OF THE INVENTION

This invention relates to radar systems and more particularly to a technique for reducing interference in a proximity fuze radar system.

As it is known in the art of missile applications, a proximity fuze is used to detect the presence of a target in proximity to the missile which, upon detection, causes the missile to detonate. The proximity fuze typically includes a radar system that transmits a signal and receives a return signal which includes a portion of the transmitted signal reflected by the target. If the received signal indicates the target is within a predetermined range from the missile, a detonation signal is provided to cause the missile to detonate. One problem with such a system is, if an undesired signal is received indicating a target is present within the predetermined range when in fact there is no target present, a detonation signal is provided causing the missile to detonate undesirably. Such undesired signals can include signals emanating from other radio frequency devices or from a radio frequency signal jammer.

To reduce the possibility of undesired detonation, alternative techniques are used to operate a proximity fuze radar system. One known technique is to modulate the transmitted signal with a phase coded signal having a maximal length pseudo-random noise code. The received signal is demodulated with the maximal length pseudo-random noise code signal delayed in time which corresponds to an appropriate range. Only properly phase coded received signals should correlate with the maximal length pseudo-random noise code signal to produce the detonation signal to detonate the missile. Unfortunately, uncorrelated signals may still be present having a signal level effective to mask a properly phase coded received signal.

A more complete discussion of maximal length sequences and implementation of biphase coded systems is described on pages 10.19–10.25 in "Radar Handbook—Second Edition", edited by Merrill I. Skolnik, published by McGraw-Hill Publishing Company, 1990. The receiver in such a system typically includes a plurality of range gate channels wherein return signals indicative of the range of a target are correlated and filtered into corresponding range gate channels. One parameter of such a system is known as out-of-range rejection (ORR) which relates to the capability of detecting a small signal in one range gate with a maximum clutter return signal in an adjacent range gate. Without a large ORR parameter, a large out of range target or a jamming system could mask a small in range target.

One technique for improving the out-of-range rejection parameter is described in a patent application entitled, "Target Detection Device and Method of Operating Same" filed on Sep. 17, 1993 and having Ser. No. 08/124321, now abandoned being assigned to the same assignee as the present invention and incorporated herein by reference. Although the just mentioned technique is suitable in some instances, alternative techniques for improving the out-of-range rejection parameter is also desirable.

SUMMARY OF THE INVENTION

With the foregoing background in mind, it is an object of this invention to provide a radar system having improved out-of-range gate Doppler signal amplitude suppression.

Another object of this invention is to provide a technique for improving jammer suppression.

Another object of this invention is to provide a technique for reducing unwanted detonation of a missile.

Still another object of this invention is to provide an improved proximity fuze radar system.

The foregoing and other objects of this invention are met generally by a proximity fuze radar system including a transmitter for transmitting a signal modulated by a pseudo-random noise code signal and a receiver for receiving signals including the modulated signal reflected by an object or target. The proximity fuze radar system further includes delay circuitry for delaying in time the pseudo-random noise code signal for providing a delayed noise code signal and circuitry for correlating a near range portion of the received signals with the delayed noise code signal and for providing base band signals. The proximity fuze radar system still further includes suppression circuitry for correlating a longer range portion of the received signals with the delayed noise code signal and for providing a rejection signal for summing the base band signals with the rejection signal to reduce the signal level of undesired signals. With such an arrangement, a radar system is provided having less susceptibility to undesired signals.

In accordance with another aspect of the present invention, a method of operating a radar system includes the steps of transmitting a signal modulated by a pseudo-random noise code signal and receiving signals including the modulated signal reflected by an object for providing received signals. The method further includes the steps of delaying in time the pseudo-random noise code signal for providing a delayed noise code signal and correlating a first portion of the received signals with the delayed noise code signal and providing base band signals. Completing the method includes the steps of correlating a second portion of the received signals with the delayed noise code signal and providing a rejection signal and summing the base band signals with the rejection signal for reducing the signal level of undesired signals. With such an arrangement, a radar system is provided having improved out-of-range doppler suppression.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
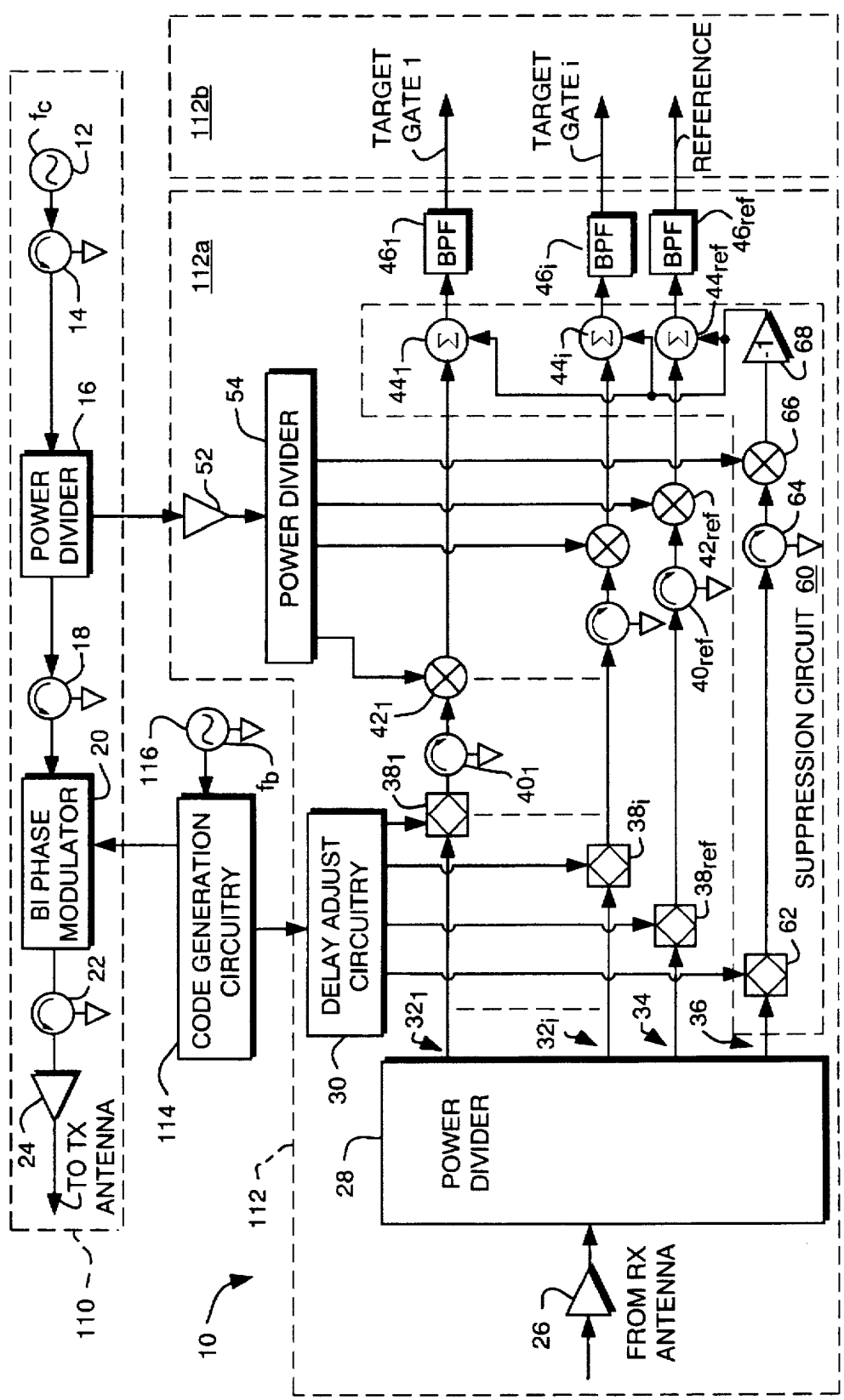
FIG. 1 is a block diagram of a proximity fuze radar system according to the invention.

Before referring to FIG. 1 in detail, it should be noted that, because the invention here is directed to an improvement in the way in which signals detected by a conventional radar system are processed, many details of such radar not required for an understanding of this invention have not been shown. Further it will be appreciated that the details of construction of the various elements shown in block form are within the knowledge of any person of skill in the art and need not be illustrated or described. With the foregoing in mind and referring now to FIG. 1, it may be seen that a proximity fuze radar system 10 (hereinafter referred to as fuze 10) includes a transmitter 110 and a receiver 112 having a RF processor portion 112a and a signal processor portion 112b. The transmitter 110 includes a signal generator 12 for producing a radio frequency (RF) signal having a predetermined frequency, $f_c$. The RF signal is processed by the signal generator to condition and amplify the RF signal as required and fed, via a circulator 14 to isolate the RF signal, to an input port of a power divider 16. The power divider 16 includes the input port and a first and a second output port wherein a signal fed to the input port is divided and coupled to the first and second output port. Here, most of the signal is coupled to the first output port. A small portion of the signal is coupled to the second output port to be fed to the receiver 112 as described hereinafter. The RF signal at the first output port of the power divider 16 is coupled, via circulator 18 to isolate the RF signal, to a first input port of a biphase RF modulator 20.

The biphase RF modulator 20 includes the first input port and a second input port and an output port wherein a signal fed to the first input port is biphase modulated by the signal fed into the second input port with the resulting modulated signal coupled to the output port. The phase of each element of the modulated signal at the output port is zero degrees or 180 degrees with respect to the signal fed to the first input port. A signal generator 116 having a frequency, $f_b$, provides a clock signal to code generation circuitry 114 wherein a pseudo-random noise code signal is generated at the frequency, $f_b$. The pseudo-random noise code signal is fed to the second input port of the biphase RF modulator 20 to modulate the RF signal fed to the first input port of the biphase RF modulator 20. The output of the biphase RF modulator 20 is fed, via circulator 22, to an input of an amplifier 24 having also an output wherein signals fed to the input thereof are amplified and provided at the output thereof. The output of the amplifier is coupled to a transmit antenna (not shown) wherein the modulated signal is radiated. The construction of the transmitter 110 as just described is conventional in detail and should be known to one of skill in the art.

A receive antenna (not shown) captures received signals (including a return signal) incident thereon which are fed to an input of an amplifier 26 wherein the received signals are amplified and provided at an output of the amplifier 26. The output of the amplifier 26 is fed to an input of a power divider 28 having a plurality of outputs. The power divider 28 is effective to divide the signal fed to the input thereof into equal portions which are provided to respective outputs. As shown, each output of the power divider 28 is coupled to a respective one of a plurality of range gate channels $32_1$ ... $32_i$, a reference channel 34 and an interference suppression channel 36.

Looking now at range gate channel $32_1$, which is representative of each one of the plurality of range gate channels $32_1$ ... $32_i$, the received signal from the power divider 28 is fed to a correlation detection circuit $38_1$ (hereinafter referred to as correlator $38_1$) wherein the received signal is correlated with the pseudo-random noise code signal delayed by a predetermined time period. It should be appreciated that the phase of the return signal with respect with pseudo-random noise code signal is shifted by an amount depending upon a target's range and velocity. The predetermined time period used to delay the pseudo-random noise code signal corresponds with the desired range to be detected by this range gate channel. Only properly phase coded signals returned within the desired range of range gate channel $32_1$ will correlate with the delayed pseudo-random noise code signal and be provided at the output of the correlator $38_1$ as a desired signal. To provide the delayed pseudo-random noise code signal, the pseudo-random noise code signal generated by code generation circuitry 114 is fed to delay adjust circuitry 30 wherein the pseudo-random noise code signal is delayed by a predetermined time period. The pseudo-random noise code signal includes a maximal-length linear sequence having a length of N bits. With a clock frequency of $f_b$, a word line exists every $f_b/(2^N-1)$ Hz and typically the Doppler signal frequency can extend to ½ of the first word line. Each range gate is set by the bit time, $1/f_b$. Thus, the time delay for the pseudo-random noise code signal for range gate channel $32_1$ is $1/f_b$ seconds and if i equals 10, then the time delay for the pseudo-random noise code signal for range gate channel $32_i$ is $10/f_b$ seconds. In a like manner, delay adjust circuitry 30 provides a different delay to the pseudo-random noise code signal for each of the different delayed pseudo-random noise code signals fed to the other respective range gate channels to provide different range gates.

The output of the correlator $38_1$ is fed, via circulator $40_1$, to a first input of a mixer $42_1$ having a second input and an output.

Digressing briefly here for a moment, as described hereinabove a portion of the RF signal from the power divider 16 is fed to the receiver 112. As shown, the portion of the RF signal fed to the receiver 112 is fed to an input of an amplifier 52 wherein the signal is amplified and provided at the output thereof. The signal at the output of the amplifier 52 is fed to an input of a power divider 54 having a plurality of outputs wherein the signal is divided into a plurality of signals with each signal provided at one of the plurality of outputs. One of the outputs of the power divider 52 is fed to the second input of the mixer $42_1$.

The mixer $42_1$ heterodynes the signal from the power divider 54 with the signal from the correlator $38_1$ to provide a first base band signal which is fed to a first input of a summer $44_1$ as to be described further hereinafter. Suffice it to say now, the summer $44_1$ adds the signal at the first input with a signal at a second input and provides the sum thereof at an output. The output of the summer $44_1$ is fed to an input of a band pass filter $46_1$.

In a like manner, a portion of the received signal from the power divider 28 is fed to each one of the correlators, including correlator $38_i$, wherein the received signal is correlated with a respective delayed pseudo-random noise code signal. Each delayed pseudo-random noise code signal is delayed by a different predetermined time period to correspond with the desired range to be detected by the respective range gate channel. Only properly phase coded signals returned within the desired range of the respective range gate channel will correlate with the corresponding delayed pseudo-random noise code signal and be provided at the output of the correlator as a desired signal.

To further process signals from each one of the range gate channels $32_1$ ... $32_i$, a reference channel 34 is provided to provide a reference signal. A portion of the received signal is fed from the power divider 28 to a correlator $38_{ref}$ wherein the portion of the received signal is correlated with the pseudo-random noise code signal from the code generation circuitry 114. Typically, for the reference channel 34, the pseudo-random noise code signal having a maximal-length linear sequence on N bits from the code generation circuitry 114 is delayed a period of time corresponding with bit "N−1". The output of the correlator $38_{ref}$ is fed, via circulator $40_{ref}$ to a first input of a mixer $42_{ref}$ having a second input and an output. The mixer $42_{ref}$ heterodynes the signal provided at the second input from the power divider 54 with the signal from the correlator $38_{ref}$ to provide a reference base band signal which is fed to an input of a summer $44_{ref}$. The output of the summer $44_{ref}$ is fed to an input of a band pass filter $46_{ref}$ wherein signals fed thereto are filtered and provided at an output thereof.

The signals captured by the receive antenna also include an uncorrelated signal typically referred to as an out-of-range doppler signal which provides a lower signal level when multiple targets are present or when an interference signal is present such as a jamming signal. The level of the out-of-range doppler signal is determined by the out-of-range rejection capability of the fuze 10. The difficulty with the out-of-range doppler signal is it provides a signal in a range gate channel when no target exists increasing the noise threshold of detectable signals.

The out-of-range rejection capability is affected by the maximal code length, N, of the pseudo-random noise code wherein a $1/N^2$ signal level becomes the signal threshold level of the system. Such a signal threshold level makes the system susceptible to interference, such as jammers, which could mask small targets and defeat the fuze 10. An adaptive threshold system would raise the threshold above the signal level of the interference, but negate most of the dynamic range of the system. As shown in Table 1, the dynamic range of a system is limited by the out-of-range rejection (ORR) which is determined by the code length N.

TABLE 1

| Shift Register Length, M | Code Length N | Rejection = $1/N^2$ ORR | ORR (dB) = 10 Log ($1/N^2$) |
|---|---|---|---|
| 1 | 1 | 1 | 0 |
| 2 | 3 | $1/3^2$ | −9.54 |
| 3 | 7 | $1/7^2$ | −16.90 |
| 4 | 15 | $1/15^2$ | −23.52 |
| 5 | 31 | $1/31^2$ | −29.82 |
| 6 | 63 | $1/63^2$ | −35.98 |
| 7 | 127 | $1/127^2$ | −42.07 |
| 8 | 255 | $1/255^2$ | −48.13 |
| 9 | 511 | $1/511^2$ | −54.16 |
| 10 | 1023 | $1/1023^2$ | −60.19 |
| 11 | 2047 | $1/2047^2$ | −66.22 |
| 12 | 4095 | $1/4095^2$ | −72.24 |

For a shift register length M, a code length N is provided wherein $N=2^M-1$ and the out-of-range rejection corresponds to $1/N^2$. As shown in the last column of Table 1, the out-of-range rejection in dB is the dynamic range limit of the system. For example, if a shift register having a length M equal to 9 is used, a code length N equal to 511 is provided. The out-of-range rejection, $1/N^2$, corresponds to $1/511^2$ which provides an ideal dynamic range limit of −54.16 dB. If two targets existed wherein one larger target had an out-of-range threshold level which limited the system threshold level and a smaller target was in range with a signal level below the out-of-range signal level, then the smaller target would be masked by the system.

Figure 2:
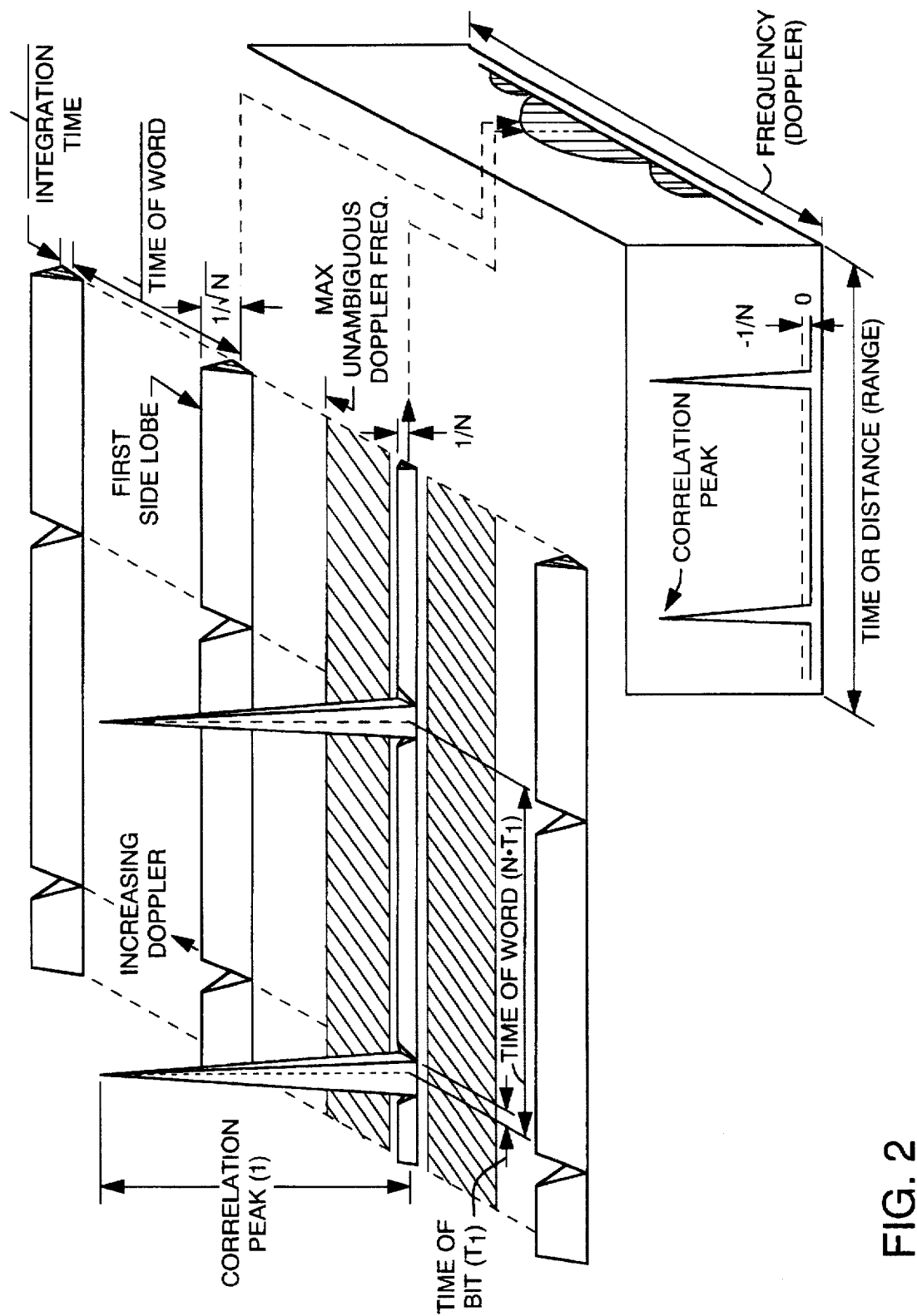
FIG. 2 is a sketch of a range vs. Doppler plane and the 1/N ridge of a radar system without a suppression circuit according to the invention.

A value of N is selected to reduce the out-of-range (uncorrelated) Doppler signal in uncorrelated range gate channels and to give a large unambiguous range. Large targets at outer range gates should not mask smaller targets in inner range gates for an effective system. However, as the value of N is increased, the code frequency and the value of N set a Doppler frequency limit, which limit the upper value of N that can be used to suppress the out-of-range (uncorrelated) Doppler signal. FIG. 2 shows a sketch of a range vs. Doppler plane and the 1/N ridge. A cut through the uncorrelated range region shows the out-of-range Doppler signal and the additional word lines which also limit Doppler frequency values. Typical systems allow Doppler frequencies up to ½ of the first word line which appears at Fcode/N. As N increases to get a larger ORR, the increase in N lowers the allowable Doppler frequency value to ½(Fcode/N), or ½ way to the first word line. The unambiguous values of doppler frequencies are shown shaded in FIG. 2. As shown in Table 2, range resolution versus code frequency is tabularized with the resulting unambiguous range for various values of N. The bottom of the table shows the out-of-range dynamic range limitation for the corresponding value of N at the top of the table.

TABLE 2

| Code Frequency | Range Res. | Unambiguous Range, Rua Meters | | | | |
|---|---|---|---|---|---|---|
| MHz | Meters | N=63 | N=127 | N=255 | N=511 | N=1023 |
| 1 | 150 | 9.45k | 19.05k | 38.25k | 76.65k | 153.45k |
| 1.5 | 100 | 6.5k | 12.7k | 25.5k | 51.1k | 102.3k |
| 2 | 75 | 4.72k | 9.52k | 19.15k | 38.32k | 76.72k |
| 5 | 30 | 1.89k | 3.84k | 7.65k | 15.33k | 30.69k |
| 10 | 15 | 945 | 1.905k | 3.825k | 7.66k | 15.34k |
| 15 | 10 | 630 | 1.27k | 2.55k | 5.11k | 10.2k |
| 20 | 7.5 | 472.5 | 952.5 | 1.912k | 3.83k | 7.67k |
| 25 | 6 | 378 | 762 | 1.53k | 3.06k | 6.13k |
| 30 | 5 | 315 | 635 | 1.275k | 2.55k | 5.11k |
| 37.5 | 4 | 252 | 508 | 1.02k | 2.04k | 4.09k |
| 40 | 3.75 | 236.2 | 476.2 | 956.2 | 1.91k | 3.83k |
| 50 | 3 | 189 | 381 | 765 | 1.53k | 3.06k |

TABLE 2-continued

| Code Frequency | Range Res. | Unambiguous Range, Rua Meters | | | | |
|---|---|---|---|---|---|---|
| MHz | Meters | N=63 | N=127 | N=255 | N=511 | N=1023 |
| 60 | 2.5 | 157.5 | 317.5 | 637.5 | 1.277k | 2.55k |
| 75 | 2 | 126 | 254 | 510 | 1.022k | 2.046k |
| 100 | 1.5 | 94.5 | 190.5 | 382.5 | 766.5 | 1.534k |
| 120 | 1.25 | 78.7 | 158.7 | 318.7 | 638.7 | 1.278k |
| 150 | 1 | 63 | 127 | 255 | 511 | 1.023k |
| Out-of-Range Rejection dB → ≅ Dynamic Range | | 35.98 dB | 42.07 dB | 48.13 dB | 54.16 dB | 60.19 dB |

It should be appreciated that the $1/N^2$ level of the amplitude of the out-of-range Doppler signal in the uncorrelated channel imposes a system limitation and provides inadequate suppression of jammers. A jamming signal passes through a demodulator resulting in a sinc $((\sin x)/x)^2$ function as shown in FIG. 2. The jamming signal word lines generated by the demodulator are only reduced to a $1/\sqrt{N}$ level. For a system with N equal to 255, the interference central frequency would be reduced by 48 dB, but the word lines are reduced by $1/\sqrt{N}$ or 24 dB. When the jammer wordline shifts frequency into the Doppler region, the word lines could defeat the system or severely limit dynamic range. An adaptive threshold system driven by a reference channel would use some of the 24 dB level left in the (N=255) system. The contemplated technique of the present invention provides for reducing the amplitude of the out-of-range Doppler signal and jammer interference signal without changing N or affecting the maximum Doppler frequency, the unambiguous range and the needed large-to-small target dynamic range.

Each one of the plurality of range gate channels $32_1 \ldots 32_i$ in the receiver 112 will have, for an out-of-range doppler signal, a sinc function $((\sin x)/x)^2$ frequency spectrum as shown in the frequency axis of FIG. 2. The level of the peak of the main lobe is down $1/\sqrt{N}$ from the received CW signal. The center frequency signal is down $1/N$ from the received CW signal. The $1/N$ signal level is the out-of-range doppler signal associated with a target that is out of the range gates. This signal exists in all of the channels of the receiver 112. An interference signal, such as from a jammer, also has an out-of-range center frequency signal with a level reduced by $1/N$ and word lines reduced to $1/\sqrt{N}$ from the interference level. The contemplated technique reduces the interference signal without reducing the desired target doppler signal, since N is unchanged.

A suppression circuit 60 is included in the receiver 112 to provide a rejection signal which having been inverted is summed with each one of the plurality of range gate channels $32_1 \ldots 32_i$ and the reference channel 34. The latter is effective to provide improved out-of-range rejection capability for large out-of-range doppler signals and for jamming signals as well as other undesired out-of-range signals.

As described hereinabove, a portion of the received signal is fed to the interference suppression channel 36 wherein said signal is fed to a first input of correlation detection circuit 62 (hereinafter referred to as correlator 62). A delayed pseudo-random noise code signal is fed to a second input of correlator 62 wherein the received signal is correlated with the pseudo-random noise code signal. It should be appreciated that none of the return signal (since the return signal will have some other delay associated with it) will correlate with the pseudo-random noise code signal of this channel, thus the only output of the correlator 62 is an undesired signal. The system parameters can be set so that signals from that range are in the noise due to transmit power and receiver losses. Here, for the interference suppression channel 36, the pseudo-random noise code signal having a maximal-length linear sequence of N bits from the code generation circuitry 114 is delayed a period of time corresponding with bit "N-2". The output of the correlator 62 is fed, via circulator 64, to a first input of a mixer 66 having a second input and an output. The mixer 66 heterodynes the signal provided at the second input from the power divider 54 with the signal from the correlator 62 to provide a base band suppression signal which is fed to an input of an inverter 68 wherein the signal is inverted and provided at an output. The signal at the output of the inverter 68 is fed to a second input of each one of a plurality of summers $44_1 \ldots 44_i$ and the summer $44_{ref}$ wherein the signal at the first input is summed with the signal at the second input in each one of the plurality of summers $44_1 \ldots 44_i$ and the summer $44_{ref}$. A resulting signal is provided at the output of each one of the plurality of summers $44_1 \ldots 44_i$ and the summer $44_{ref}$ and fed to a corresponding one of a plurality of band pass filters $46_1 \ldots 46_i$ and $46_{ref}$.

Figure 3A:
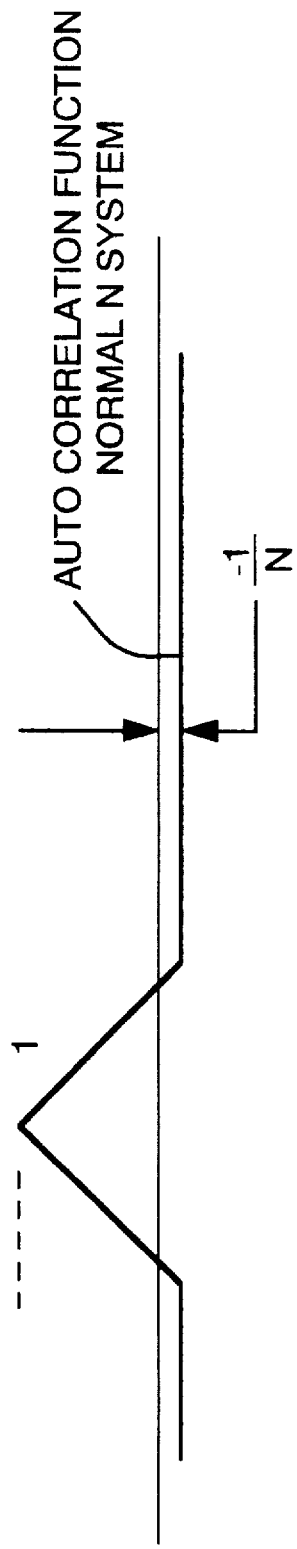
FIG. 3A is a sketch of an autocorrelation function in a system without an interference suppression circuit.
Figure 3B:
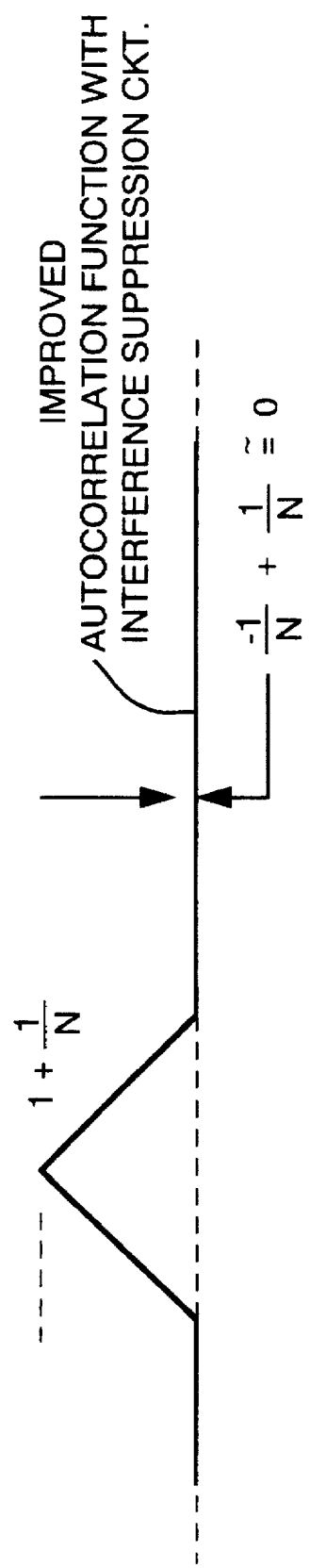
FIG. 3B is a sketch of an autocorrelation function in a system with an interference suppression circuit according to the invention.

Referring now also to FIGS. 3A and 3B, it should be appreciated that the interference out-of-range doppler signal exists in the receiver uncorrelated channels based on the standard 0/180 degree bi-phase modulated carrier return signal (i.e. return signal). The return signal is shifted in frequency due to the relative source to target velocity so that the center frequency could be shifted up or down in frequency from that shown in FIG. 2. The signal about the center frequency is the desired signal or alternatively a bandpass about an intermediate frequency (IF) signal is a desired signal which can be filtered by low pass or bandpass doppler filters respectively in base band or IF systems. If the residual $-1/N$ signal level as shown in FIG. 3A from the return signal reflected from a target was reduced, then the threshold signal level of the system could be reduced without changing the N of the system. The interference suppression channel 36 inverts the signal spectrum providing a $+1/N$ signal level and then by summing the $+1/N$ signal level with the signal of a normal channel (i.e. $-1/N$ signal level), a cancellation effect occurs as shown in FIG. 3B. In a similar manner, if a jammer signal is present, then the return word lines and the interference word lines from the jammer in the suppression circuit channel and the normal channel are summed (i.e. $-1/\sqrt{N}$ signal level with the $1/\sqrt{N}$ signal level) resulting in a reduction of the interference level. The latter reduces the out-of-range Doppler signal so that a large target out-of-range does not mask a smaller target that is in range.

It should be noted that the above described technique will suppress interference signals from CW, AM, FM or phase modulated jammers. By compensating the reference channel, then any adaptive threshold signal level techniques used will track with reduced interference signal levels. It should also be noted that the suppression circuit also reduces common coherent noise.

The suppression circuit 60 provides dynamic range for multiple targets or a single target with a jammer or other interference source. The 1/N signal level floor of the system is reduced allowing lower thresholds which provides smaller target detection capability. The $1/\sqrt{N}$ word lines are reduced and any jammer signals moving into the doppler region where the inverter and the summer operates.

Figure 4:
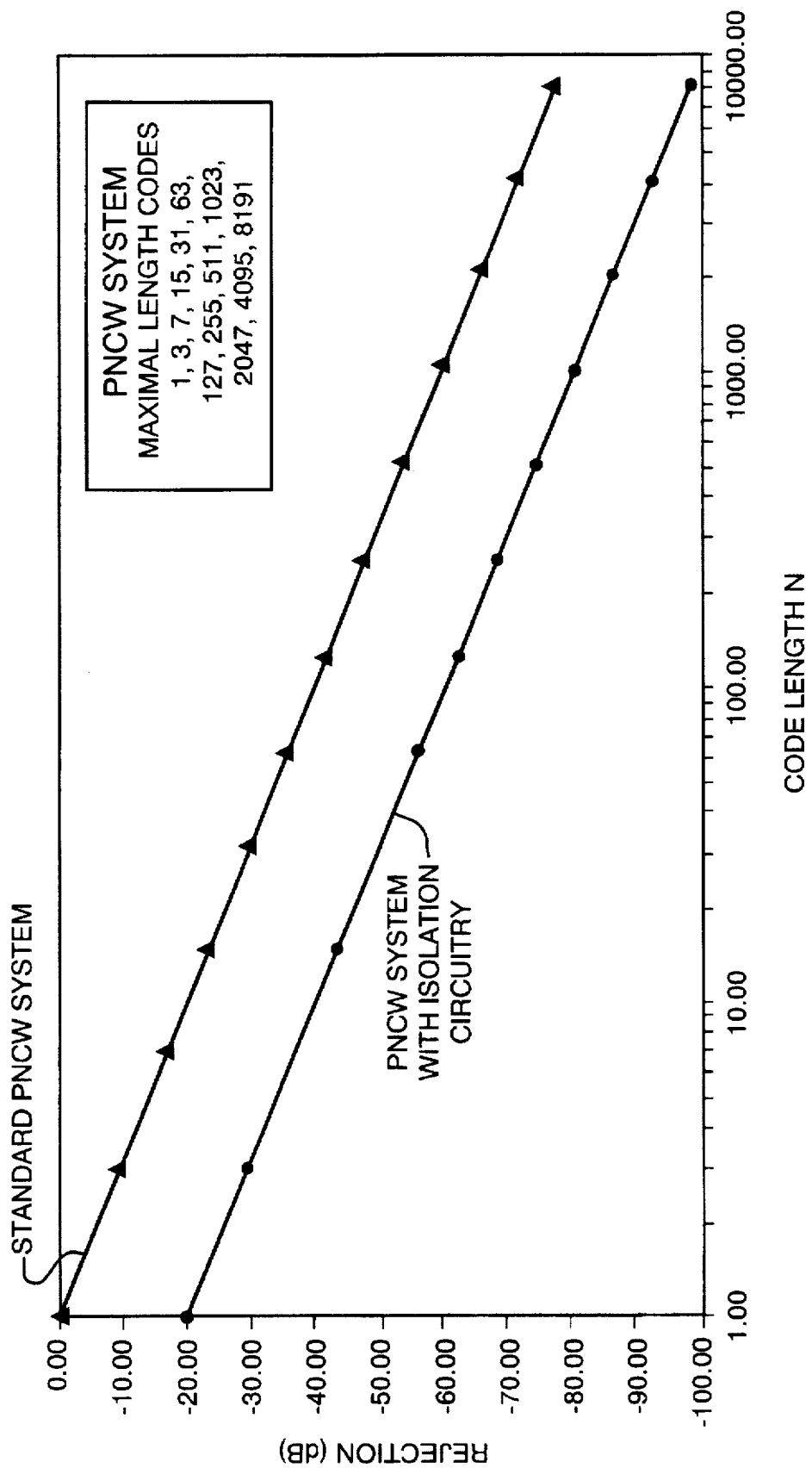
FIG. 4 is a plot of the out-of-range rejection parameter in dB versus code length.

The improvement in ORR is limited by the range gate channel to interference suppression channel gain and phase balances. FIG. 4 shows a plot of a standard PNCW system ORR versus code length and a plot of ORR versus code length of a PNCW system with the suppression circuit having a channel to channel phase imbalance of ±5 degrees and a gain imbalance of 0.5 dB. Twenty dB of improvement would be achieved by this imbalance condition. The importance of this is that a standard PNCW system would need a code length increase for example of N=255 to N=2047 to attain the 18 dB improvement of ORR. However the Doppler frequency range would be decreased by 2047/255= 8.0275 times, limiting the maximum target closing velocity measurement. The Doppler frequency is not reduced with the ORR improvement using the contemplated invention.

Figure 5:
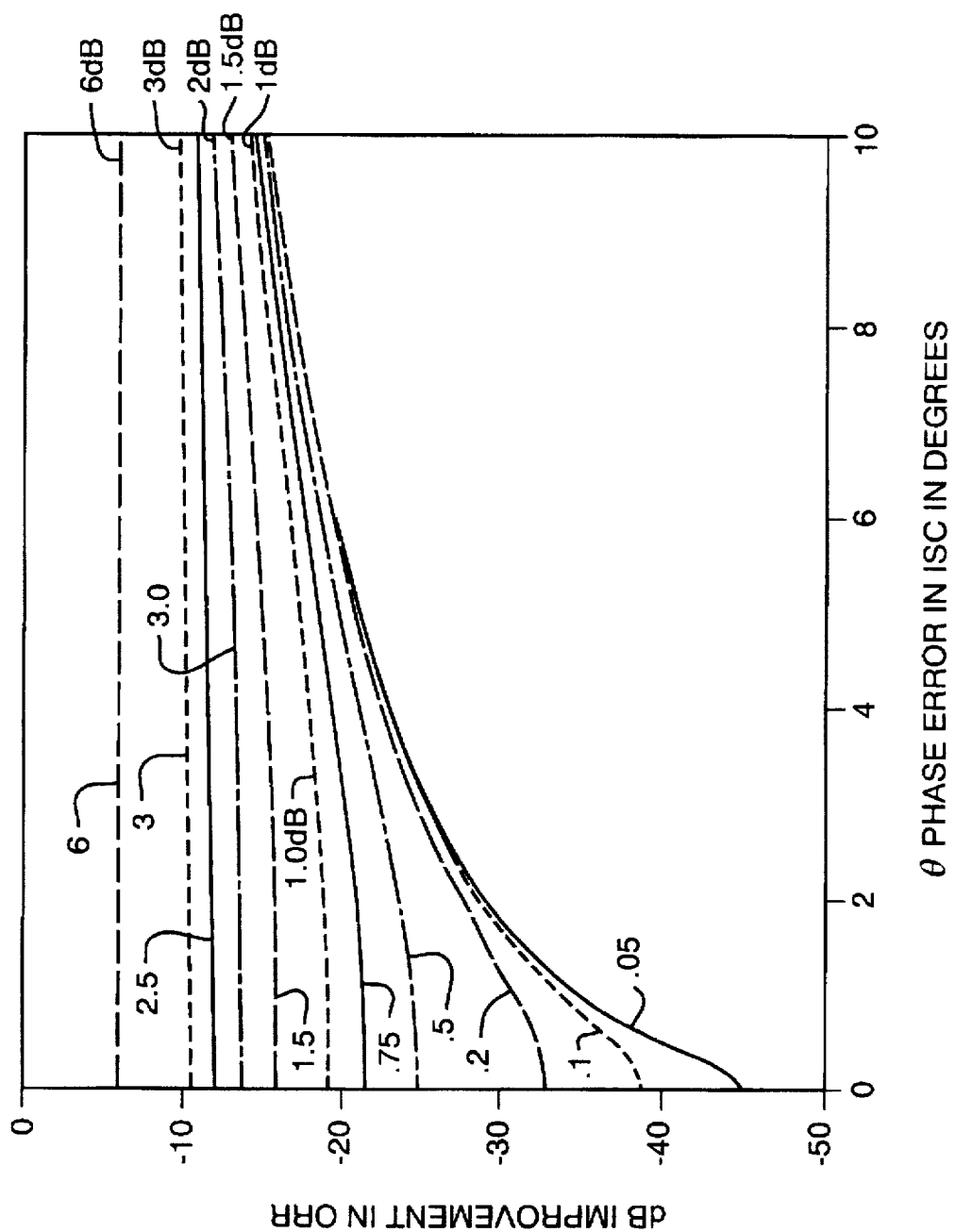
FIG. 5 is a plot of the out-of-range rejection parameter in dB versus phase error in degrees in the isolation channel for various values of gain error between the channels.
Figure 6:
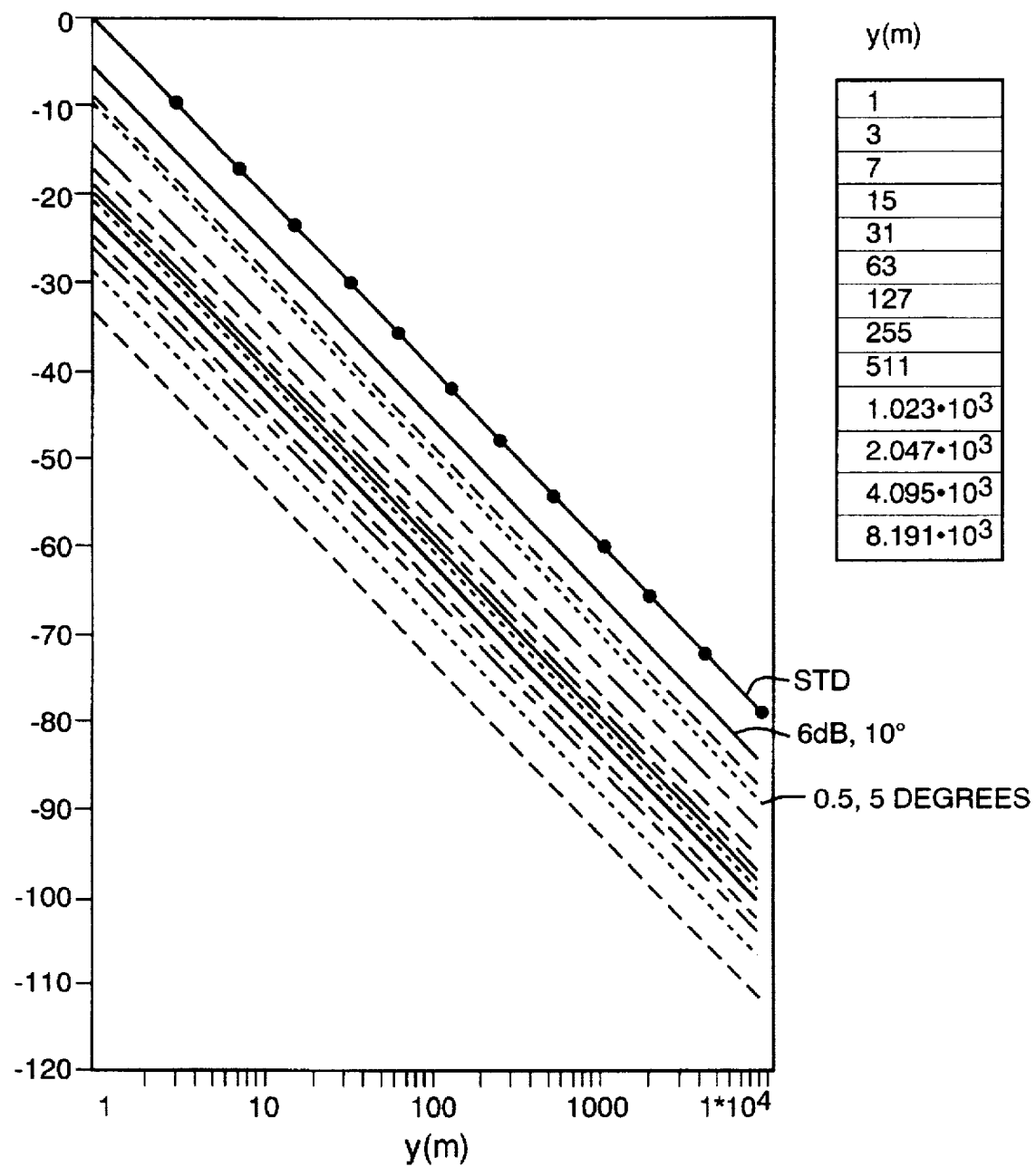
FIG. 6 is a plot of the out-of-range rejection parameter in dB versus code length for various values of gain error and phase error.

FIG. 5 is a plot of the out-of-range rejection parameter in dB versus phase error in degrees between the isolation channel and a respective correlation channel for various values of gain error between the channels. For example, it should be appreciated that for a gain error of 0.05 dB, the improvement in ORR varies from −45 dB for a zero degree phase error to −16 dB for a 10 degree phase error. For a gain error of 6 dB, the improvement in ORR varies from −6 dB for a zero degree phase error to −6 dB for a 10 degree phase error. FIG. 6 is a plot of the out-of-range rejection parameter in dB versus code length for various values of gain error and phase error between the channels.

It should be appreciated that although the embodiment described performs correlation on an RF signal, the suppression will also work if the correlation is done on an IF signal, i.e. after the mixers $42_1 \ldots 42_i$ or for video correlation. The interference suppression circuit will suppress out-of-range targets, jammers, out-of-range main lobe clutter and out-of-range altitude returns. All out-of-range signals will be suppressed whereas in-range signals are not suppressed.

Having described this invention, it will now be apparent to one of skill in the art that various modifications could be made thereto without affecting this invention. It is felt, therefore, that this invention should not be restricted to its disclosed embodiment, but rather should be limited only by the spirit and scope of the appended claims.

What is claimed is:

1. A radar system comprising:
   (a) means, responsive to a first portion of received signals and a first delayed noise code signal, for correlating the first portion of received signals with the first delayed noise code signal and for providing a plurality of desired and undesired signals having a signal level;
   (b) means, responsive to a second portion of received signals and a second delayed noise code signal, for correlating the second portion of received signals with the second delayed noise code signal and for providing a rejection signal; and
   (c) means, responsive to the plurality of desired and undesired signals and the rejection signal, for summing the desired and undesired signals with the rejection signal for reducing the signal level of undesired signals.

2. The radar system as recited in claim 1 wherein the delayed noise code signal has a maximal length pseudo-random noise code.

3. The radar system as recited in claim 2 wherein the maximal length pseudo-random noise code of the delayed noise code signal has N bits and the second delayed noise code signal is delayed a period of time corresponding with bit N−2.

4. The radar system as recited in claim 3 comprising:
   (a) means, responsive to a third portion of the received signals and a third delayed noise code signal, for correlating the third portion of received signals with the third delayed noise code signal and for providing a reference channel including desired and undesired signals having a signal level; and
   (b) means, responsive to the reference channel including desired and undesired signals and the rejection signal, for summing the desired and undesired signals of the reference channel with the rejection signal for reducing the signal level of undesired signals of the reference channel.

5. A proximity fuze radar system comprising:
   (a) means for transmitting a modulated signal modulated by a pseudo-random noise code signal;
   (b) means for receiving signals including the modulated signal reflected by an object for providing received signals;
   (c) means for delaying in time the pseudo-random noise code signal for providing a first and a second delayed noise code signal;
   (d) means for correlating a first portion of the received signals with the first delayed noise code signal and for providing desired and undesired baseband signals having a signal level;
   (e) means for correlating a second portion of the received signals with the second delayed noise code signal and for providing a rejection signal; and
   (f) means for summing the baseband signals with the rejection signal for reducing the signal level of undesired baseband signals.

6. The proximity fuze radar system as recited in claim 5 wherein the pseudo-random noise code signal has a maximal length pseudo-random noise code.

7. The proximity fuze radar system as recited in claim 6 wherein the maximal length pseudo-random noise code of the pseudo-random noise code signal has N bits and the second delayed noise code signal is delayed a period of time corresponding with bit N−2.

8. The proximity fuze radar system as recited in claim 7 comprising:
   (a) means for delaying in time the pseudo-random noise code signal for providing a third delayed noise code signal;
   (b) means, responsive to a third portion of the received signals and the third delayed noise code signal, for correlating the third portion of the received signals with the third delayed noise code signal and for providing a reference channel including desired and undesired signals having a signal level; and (c) means, responsive to the reference channel including desired and undesired signals and the rejection signal, for summing the desired and undesired signals of the reference channel with the rejection signal for reducing the signal level of undesired signals of the reference channel.

9. The proximity fuze radar system as recited in claim 8 wherein the third delayed noise code signal is delayed a period of time corresponding with bit N−1.

10. A method of operating a radar system comprising the steps of:

(a) transmitting a modulated signal modulated by a pseudo-random noise code signal;

(b) receiving signals including the modulated signal reflected by an object for providing received signals;

(c) delaying in time the pseudo-random noise code signal for providing a first and a second delayed noise code signal;

(d) correlating a first portion of the received signals with the first delayed noise code signal and providing desired and undesired baseband signals having a signal level;

(e) correlating a second portion of the received signals with the second delayed noise code signal and providing a rejection signal; and (f) summing the baseband signals with the rejection signal for reducing the signal level of the undesired baseband signals.

11. The method as recited in claim 10 wherein the pseudo-random noise code signal has a maximal length pseudo-random noise code.

12. The method as recited in claim 11 wherein the maximal length pseudo-random noise code of the pseudo-random noise code signal has N bits and the second delayed noise code signal is delayed a period of time corresponding with bit N−2.

13. The method as recited in claim 12 further comprising the steps of:

(a) delaying in time the pseudo-random noise code signal for providing a third delayed noise code signal;

(b) correlating the third portion of the received signals with the third delayed noise code signal and for providing a reference channel including desired and undesired signals having a signal level; and (c) summing the desired and undesired signals of the reference channel with the rejection signal for reducing the signal level of undesired signals of the reference channel.

14. The method as recited in claim 13 wherein the third delayed noise code signal is delayed a period of time corresponding with bit N−1.

* * * * *